US012775321B2

(12) United States Patent
Oiwa et al.

(10) Patent No.: US 12,775,321 B2
(45) Date of Patent: Oct. 27, 2026

(54) POWER SUPPLY CONTROL APPARATUS, POWER SUPPLY CONTROL METHOD, AND POWER SUPPLY CONTROL PROGRAM

(71) Applicant: NTT, Inc., Tokyo (JP)

(72) Inventors: Hiroshi Oiwa, Tokyo (JP); Hiroshi Yoshida, Tokyo (JP)

(73) Assignee: NTT, Inc., Tokyo (JP)

( * ) Notice: Subject to any disclaimer, the term of this patent is extended or adjusted under 35 U.S.C. 154(b) by 484 days.

(21) Appl. No.: 18/556,198

(22) PCT Filed: Apr. 28, 2021

(86) PCT No.: PCT/JP2021/017001
§ 371 (c)(1),
(2) Date: Oct. 19, 2023

(87) PCT Pub. No.: WO2022/230116
PCT Pub. Date: Nov. 3, 2022

(65) Prior Publication Data
US 2024/0219984 A1 Jul. 4, 2024

(51) Int. Cl.
*G06F 1/26* (2006.01)
*H02J 7/80* (2026.01)
*H02J 7/90* (2026.01)

(52) U.S. Cl.
CPC ................ *G06F 1/263* (2013.01); *H02J 7/80* (2026.01); *H02J 7/933* (2026.01)

(58) Field of Classification Search
CPC ... G06F 1/263; G06F 1/28; G06F 1/30; G06F 11/20; H02J 7/80; H02J 7/933; H02J 7/00
See application file for complete search history.

(56) References Cited

U.S. PATENT DOCUMENTS

2006/0005097 A1 1/2006 Ichikawa et al.
2014/0143189 A1* 5/2014 Matsuyama ........... G06N 20/00 706/12

FOREIGN PATENT DOCUMENTS

JP 200618758 1/2006
JP 20198718 1/2019

OTHER PUBLICATIONS

Linux-ha.osdn.jp [online], "Pacemaker overview," available on or before Nov. 21, 2015, retrieved on Mar. 2021, retrieved from URL<https://linux-ha.osdn.jp/wp/manual/pacemaker_outline>, 9 pages (with machine translation).

* cited by examiner

*Primary Examiner* — Mohammad Ali
*Assistant Examiner* — Saad M Kabir
(74) *Attorney, Agent, or Firm* — Fish & Richardson P.C.

(57) ABSTRACT

A power supply control device according to an embodiment includes, in a redundant device system, a first power supply and a second power supply that supply power to a first device and a second device that are mutually monitored in a mutual monitoring process, and a power supply control unit that switches an operation state of the first device and the second device based on whether a power consumption pattern of first power consumption of the first device and second power consumption of the second device is normal.

6 Claims, 5 Drawing Sheets

Fig. 5

| | | | | ZERO-SYSTEM DEVICE | | | | | | | |
|---|---|---|---|---|---|---|---|---|---|---|---|
| | | | OPERATION | ACT | | | | SBY | | | |
| | | | MUTUAL MONITORING | NORMAL | | ABNORMAL | | NORMAL | | ABNORMAL | |
| | OPERATION | MUTUAL MONITORING | OPERATION STATE | NORMAL | ABNORMAL | NORMAL | ABNORMAL | NORMAL | ABNORMAL | NORMAL | ABNORMAL |
| ONE-SYSTEM DEVICE | ACT | NORMAL | NORMAL | NOT EXIST (BOTH SYSTEMS ARE ACT) | NOT EXIST (BOTH SYSTEMS ARE ACT) | NOT EXIST (BOTH SYSTEMS ARE ACT) | NOT EXIST (BOTH SYSTEMS ARE ACT) | ZERO-SYSTEM: POWER FEEDING ONE-SYSTEM: POWER FEEDING | ZERO-SYSTEM: POWER FEEDING ONE-SYSTEM: POWER FEEDING | NOT EXIST | NOT EXIST |
| | | | ABNORMAL | NOT EXIST (BOTH SYSTEMS ARE ACT) | NOT EXIST (BOTH SYSTEMS ARE ACT) | NOT EXIST (BOTH SYSTEMS ARE ACT) | NOT EXIST (BOTH SYSTEMS ARE ACT) | ZERO-SYSTEM: POWER FEEDING ONE-SYSTEM: POWER FEEDING | ZERO-SYSTEM: POWER FEEDING ONE-SYSTEM: POWER FEEDING | NOT EXIST | NOT EXIST |
| | | ABNORMAL | NORMAL | NOT EXIST (BOTH SYSTEMS ARE ACT) | NOT EXIST (BOTH SYSTEMS ARE ACT) | NOT EXIST (BOTH SYSTEMS ARE ACT) | NOT EXIST (BOTH SYSTEMS ARE ACT) | NOT EXIST | NOT EXIST | ZERO-SYSTEM: CUT OFF ONE-SYSTEM: POWER FEEDING | ZERO-SYSTEM: CUT OFF ONE-SYSTEM: POWER FEEDING |
| | | | ABNORMAL | NOT EXIST (BOTH SYSTEMS ARE ACT) | NOT EXIST (BOTH SYSTEMS ARE ACT) | NOT EXIST (BOTH SYSTEMS ARE ACT) | NOT EXIST (BOTH SYSTEMS ARE ACT) | NOT EXIST | NOT EXIST | ZERO-SYSTEM: POWER FEEDING ONE-SYSTEM: CUT OFF | ZERO-SYSTEM: POWER FEEDING ONE-SYSTEM: CUT OFF |
| | SBY | NORMAL | NORMAL | ZERO-SYSTEM: POWER FEEDING ONE-SYSTEM: POWER FEEDING | ZERO-SYSTEM: POWER FEEDING ONE-SYSTEM: POWER FEEDING | NOT EXIST | NOT EXIST | NOT EXIST (BOTH SYSTEMS ARE SBY) | NOT EXIST (BOTH SYSTEMS ARE SBY) | NOT EXIST (BOTH SYSTEMS ARE SBY) | NOT EXIST (BOTH SYSTEMS ARE SBY) |
| | | | ABNORMAL | ZERO-SYSTEM: POWER FEEDING ONE-SYSTEM: POWER FEEDING | ZERO-SYSTEM: POWER FEEDING ONE-SYSTEM: POWER FEEDING | NOT EXIST | NOT EXIST | NOT EXIST (BOTH SYSTEMS ARE SBY) | NOT EXIST (BOTH SYSTEMS ARE SBY) | NOT EXIST (BOTH SYSTEMS ARE SBY) | NOT EXIST (BOTH SYSTEMS ARE SBY) |
| | | ABNORMAL | NORMAL | NOT EXIST | NOT EXIST | ZERO-SYSTEM: POWER FEEDING ONE-SYSTEM: CUT OFF | ZERO-SYSTEM: CUT OFF ONE-SYSTEM: POWER FEEDING | NOT EXIST (BOTH SYSTEMS ARE SBY) | NOT EXIST (BOTH SYSTEMS ARE SBY) | NOT EXIST (BOTH SYSTEMS ARE SBY) | NOT EXIST (BOTH SYSTEMS ARE SBY) |
| | | | ABNORMAL | NOT EXIST | NOT EXIST | ZERO-SYSTEM: POWER FEEDING ONE-SYSTEM: CUT OFF | ZERO-SYSTEM: CUT OFF ONE-SYSTEM: POWER FEEDING | NOT EXIST (BOTH SYSTEMS ARE SBY) | NOT EXIST (BOTH SYSTEMS ARE SBY) | NOT EXIST (BOTH SYSTEMS ARE SBY) | NOT EXIST (BOTH SYSTEMS ARE SBY) |

POWER SUPPLY CONTROL APPARATUS, POWER SUPPLY CONTROL METHOD, AND POWER SUPPLY CONTROL PROGRAM

CROSS-REFERENCE TO RELATED APPLICATIONS

This application is a National Stage application under 35 U.S.C. § 371 of International Application No. PCT/JP2021/017001, having an International Filing Date of Apr. 28, 2021, the disclosure of which is considered part of the disclosure of this application, and is incorporated by reference in its entirety into this application.

TECHNICAL FIELD

The present invention relates to a power supply control device, a power supply control method, and a power supply control program.

BACKGROUND ART

As disclosed in NPL 1, for example, in a redundancy system having an active-standby (ACT-SBY) configuration, two devices monitor each other so that both devices are not in an active-active state due to interruption or the like.

CITATION LIST

Non Patent Literature

[NPL 1] "Outline of Pacemaker", [online], Linux®-HA Japan [retrieved on Mar. 15, 2021], Internet <URL: https://linux-ha.osdn.jp/wp/manual/pacemaker_outline>

SUMMARY OF INVENTION

Technical Problem

In the related art, when mutual monitoring of the ACT-SBY configuration is interrupted due to a failure or the like, the software of the device in a standby (SBY) state is stopped from preventing the device in the SBY state from shifting to an active (ACT) state, and the redundancy system configuration is degraded to a single configuration. For this reason, when the mutual monitoring fails and the device in the active state is in an abnormal state due to a failure or the like, both configurations are stopped.

An object of the present invention is to allow a redundancy system to continue to operate normally even when mutual monitoring is interrupted and a device in the ACT state is in an abnormal state.

Solution to Problem

In order to solve the above problem, a power supply control device of the present invention includes a first power supply and a second power supply that supply power to a first device and a second device that are mutually monitored in a mutual monitoring process in a redundant device system, and a power supply control unit that switches an operation state of the first device and the second device based on whether a power consumption pattern of first power consumption of the first device and second power consumption of the second device is normal.

Advantageous Effects of Invention

According to one aspect of the present invention, even when mutual monitoring is interrupted and the device in the ACT state is in an abnormal state, the redundant system can operate normally.

BRIEF DESCRIPTION OF DRAWINGS

FIG. 5 is a table showing power supply states in each state of a zero-system device and a one-system device.

DESCRIPTION OF EMBODIMENTS

Hereinafter, an embodiment according to the present invention will be described with reference to the drawings.

[Configuration]

Figure 1:
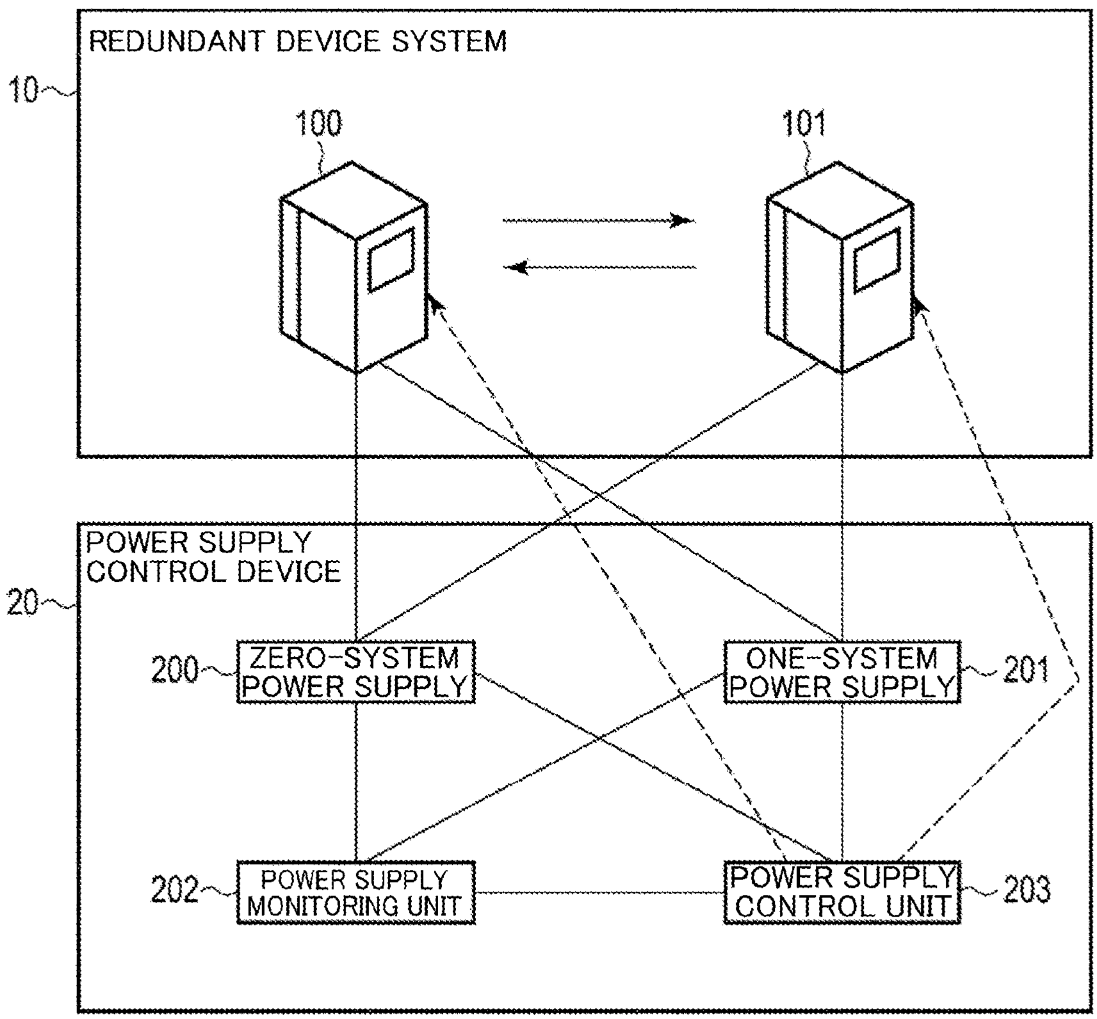
FIG. 1 is a schematic diagram illustrating an example of a redundant system including a redundant device system and a power supply control device.

FIG. 1 is a schematic diagram illustrating an example of a redundant system including a redundant device system 10 and a power supply control device 20.

The redundant device system 10 includes a zero-system device 100 and a one-system device 101. The zero-system device 100 and the one-system device 101 are devices having the same or substantially the same processing capacity, and when one is in the ACT state, the other is in the SBY state. In addition, the zero-system device 100 and the one-system device 101 monitor each other so that the devices are neither both in the ACT state nor both in the SBY state. Further, a method for mutual monitoring will be described later.

The zero-system device 100 and the one-system device 101 of the redundant device system 10 may be, for example, a server or the like. That is, the zero-system device 100 and the one-system device 101 may provide services to the other device through a network. In addition, the zero-system device 100 and the one-system device 101 can switch from the SBY state to the ACT state in accordance with supplied power.

The power supply control device 20 supplies power to the zero-system device 100 and the one-system device 101 of the redundant device system 10. In addition, the power supply control device 20 includes a zero-system power supply 200, a one-system power supply 201, a power supply monitoring unit 202, and a power supply control unit 203.

Each of the zero-system power supply 200 and the one-system power supply 201 can supply power to the zero-system device 100 and the one-system device 101, respectively. For example, when the zero-system device 100, the one-system device 101, and the mutual monitoring are operating normally, the zero-system power supply 200 supplies power to the zero-system device 100, and the one-system power supply 201 supplies power to the one-system device 101. In addition, this example is a mere example, and it is needless to say that both the zero-system power supply 200 and the one-system power supply 201 may supply power to the zero-system device 100 and the one-system device 101.

The power supply monitoring unit 202 monitors power supplied to the zero-system device 100 and the one-system device 101 by the zero-system power supply 200 and the one-system power supply 201, and detects power consumption of the zero-system device 100 and the one-system device 101. The power supply monitoring unit 202 transmits power consumption information including information on the detected power consumption of the zero-system device 100 and the detected power consumption of the one-system device 101 to the power supply control unit 203.

The power supply control unit 203 controls power supply from the zero-system power supply 200 and the one-system power supply 201 to the zero-system device 100 and the one-system device 101.

In addition, the power supply control unit 203 determines whether a power consumption pattern based on the power consumption included in the power consumption information is normal or abnormal. The determination of whether the power consumption pattern based on the power consumption is normal or abnormal will be described later.

In addition, the power supply control unit 203 compares the power consumption of the zero-system device with the power consumption of the one-system device to determine whether the zero-system device 100 is in an ACT state. For example, when the power consumption of the zero-system device is larger, the power supply control unit 203 determines that the zero-system device 100 is in the ACT state.

Furthermore, the power supply control unit 203 determines whether an operation state of the zero-system device 100 or the one-system device 101 in the ACT state is normal based on the power consumption. For example, when the one-system device 101 is in the ACT state, the power supply control unit 203 determines whether the operation state of the one-system device 101 is normal based on whether the power consumption of the one-system device 101 is within a certain range.

Furthermore, the power supply control unit 203 controls power supply from the zero-system power supply 200 and the one-system power supply 201 to the zero-system device 100 and the one-system device 101 in accordance with whether the zero-system device 100 or the one-system device 101 in the ACT state is normal or abnormal. Further, the control method will be described later. In addition, the power supply control unit 203 may transmit control signals to the zero-system device 100 and the one-system device 101 as indicated by the broken-line arrows in FIG. 1, and control the zero-system device 100 and the one-system device 101 to transition from the SBY state to the ACT state.

Figure 2:
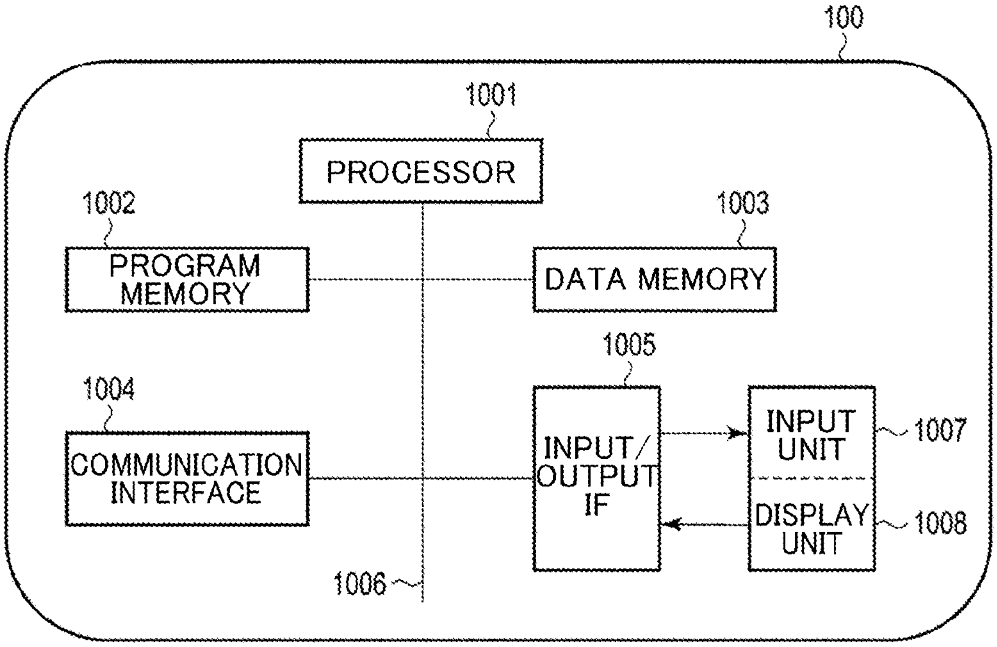
FIG. 2 is a block diagram illustrating an example of a hardware configuration of a zero-system device.

FIG. 2 is a block diagram illustrating an example of a hardware configuration of a zero-system device 100. Further, the one-system device 101 constitutes a redundant system together with the zero-system device, and has hardware the same as or similar to the zero-system device.

The zero-system device 100 includes a hardware processor 1001 such as a central processing unit (CPU) or a micro processing unit (MPU). In addition, a program memory 1002, a data memory 1003, a communication interface 1004, and an input/output interface 1005 are connected to the processor 1001 via a bus 1006. Further, the "input/output interface" is abbreviated as "input/output IF" in FIG. 2.

The program memory 1002 can be used as a storage medium in combination with non-volatile memories such as an erasable programmable read only memory (EPROM), a hard disk drive (HDD), and a solid state drive (SSD) which makes writing and reading possible at any time with a non-volatile memory such as a read only memory (ROM). The program memory 1002 stores programs necessary for executing various kinds of processing. That is, all processing function units in the zero-system device 100 or the one-system device 101 can be implemented by reading and executing the programs stored in the program memory 1002 by the processor 1001. The programs stored in the program memory 1002 include a mutual monitoring program for performing mutual monitoring with the other system device (in this case, the one-system device 101), and changing the ACT state/SBY state of the own device according to the state of the other system device.

The data memory 1003 is a storage serving as a storage medium that uses a combination of, for example, a non-volatile memory to and from which data can be written and read at any time such as an HDD or a memory card and a volatile memory such as a random access memory (RAM). The data memory 1003 is used to store data acquired and generated when the processor 1001 executes the program and carries out various types of processing.

The communication interface 1004 includes one or more wired or wireless communication modules. For example, the communication interface 1004 includes a communication module for connecting to another device in a wired or wireless manner. In addition, the communication interface 1004 may include a wireless communication module that wirelessly connects to a Wi-Fi access point, a base station, and the like. For example, the communication interface 1004 may include a wireless communication module for wirelessly connecting to another device using a short-range wireless technology. In other words, the communication interface 1004 may be a general communication interface as long as the communication interface 1004 can communicate with another device or the like under control of the processor 1001 to transmit and receive various kinds of information.

An input/output unit 1007 and a display unit 1008 are connected to the input/output interface 1005.

The input unit 1007 is, for example, an input detection sheet which is disposed on the display screen of a display that is the display unit 1008 adopting an electrostatic method or a pressure method, and outputs a touch position of the manager of the zero-system device to the processor 1001 via the input/output interface 1005.

The display unit 1008 is a display device that uses, for example, liquid crystal, organic electro luminescence (EL), or the like and displays images and messages in accordance with signals input from the input/output interface 1005.

Figure 3:
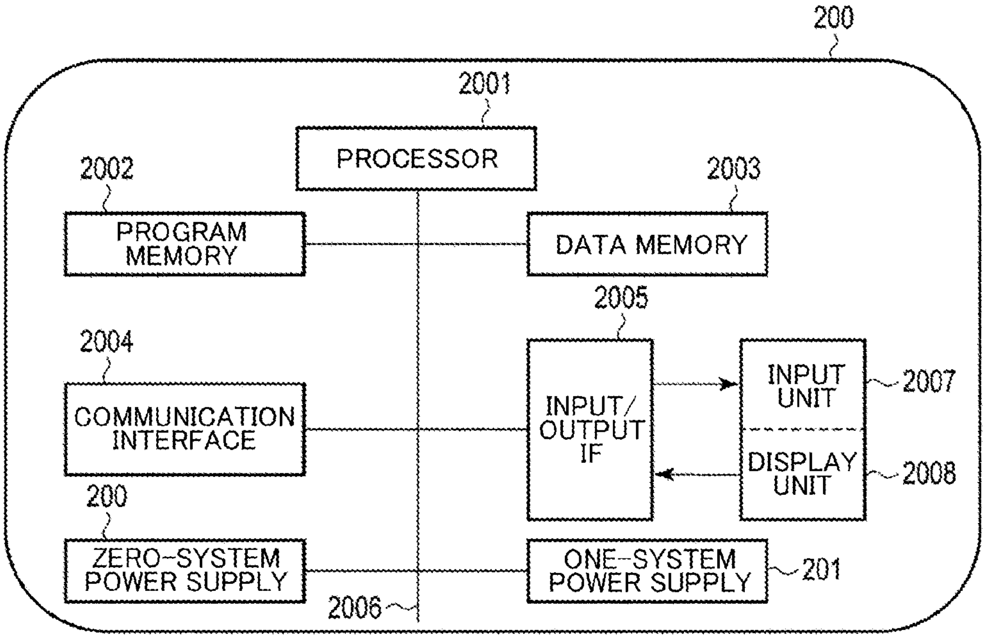
FIG. 3 is a block diagram illustrating a functional configuration of a power supply control device.

FIG. 3 is a block diagram illustrating a functional configuration of the power supply control device 20.

The power supply control device 20 has a hardware processor 2001 such as a CPU and an MPU. In addition, a program memory 2002, a data memory 2003, a communication interface 2004, an input/output interface 2005, the zero-system power supply 200, and the one-system power supply 201 are connected to the processor 2001 via a bus 2006. Further, the "input/output interface" is abbreviated as "input/output IF" in FIG. 3.

The program memory 2002 is able to use a combination of, for example, a non-volatile memory such as an EPROM, an HDD or an SSD to and from which data can be written and read at any time and a non-volatile memory such as a ROM as a storage medium. The program memory 2002 stores programs that are required to execute various types of processing. In other words, all of processing functional units of the power supply control device 20 can be implemented when the processor 2001 reads and executes a program stored in the program memory 2002. The program stored in the program memory 2002 includes a power supply control program according to one embodiment.

The data memory 2003 is a storage serving as a storage medium that uses a combination of, for example, a non-volatile memory to and from which data can be written and read at any time such as an HDD or a memory card and a volatile memory such as a RAM. The data memory 2003 is used to store data acquired and generated when the processor 2001 executes the program and carries out various types of processing.

The communication interface 2004 includes one or more wired or wireless communication modules. For example, the communication interface 2004 can include a communication module for connecting to another apparatus in a wired or wireless manner. In other words, the communication interface 2004 may be a general communication interface as long as the communication interface 2004 can perform communication with another device or the like under control of the processor 2001 to transmit and receive various kinds of information. For example, the processor 2001 can transmit a control signal to the zero-system device 100 and the one-system device 101 via the communication interface 2004.

An input unit 2007 and a display unit 2008 are connected to the input/output interface 2005.

The input unit 2007 is, for example, an input detection sheet which is disposed on the display screen of a display device that is the display unit 2008 adopting an electrostatic method or a pressure method, and outputs a touch position of the manager of the power supply control device 20 to the processor 2001 via the input/output interface 2005.

The display unit 2008 is a display device that uses, for example, liquid crystal, organic EL, or the like, and displays images and messages in accordance with signals input from the input/output interface 2005.

In addition, as described with reference to FIG. 1, the zero-system power supply 200 and the one-system power supply 201 can supply power to the zero-system device 100 and the one-system device 101, respectively. Further, the zero-system power supply 200 and the one-system power supply 201 are power supplies for supplying power to the zero-system device 100 and the one-system device 101, and may be constructed as separate power supply devices, or may be constructed by one power supply device and a switch disposed on a power feeding path to the power supply device, the zero-system device 100 and the one-system device 101 to feed/cut off power supply.

The processor 2001 executing a power supply control program according to an embodiment controls the presence or absence of power feeding from the zero-system power supply 200 and the one-system power supply 201 to the zero-system device 100 and the one-system device 101 via the bus 2006. Furthermore, the processor 2001 can acquire information on the amount of electric power supplied to each of the zero-system device 100 and the one-system device 101 by the zero-system power supply 200 and the one-system power supply 201 through the bus 2006, and detect the power consumption of the zero-system device 100 and the one-system device 101 from the acquired amount of electric power.

[Operations]

Figure 4:
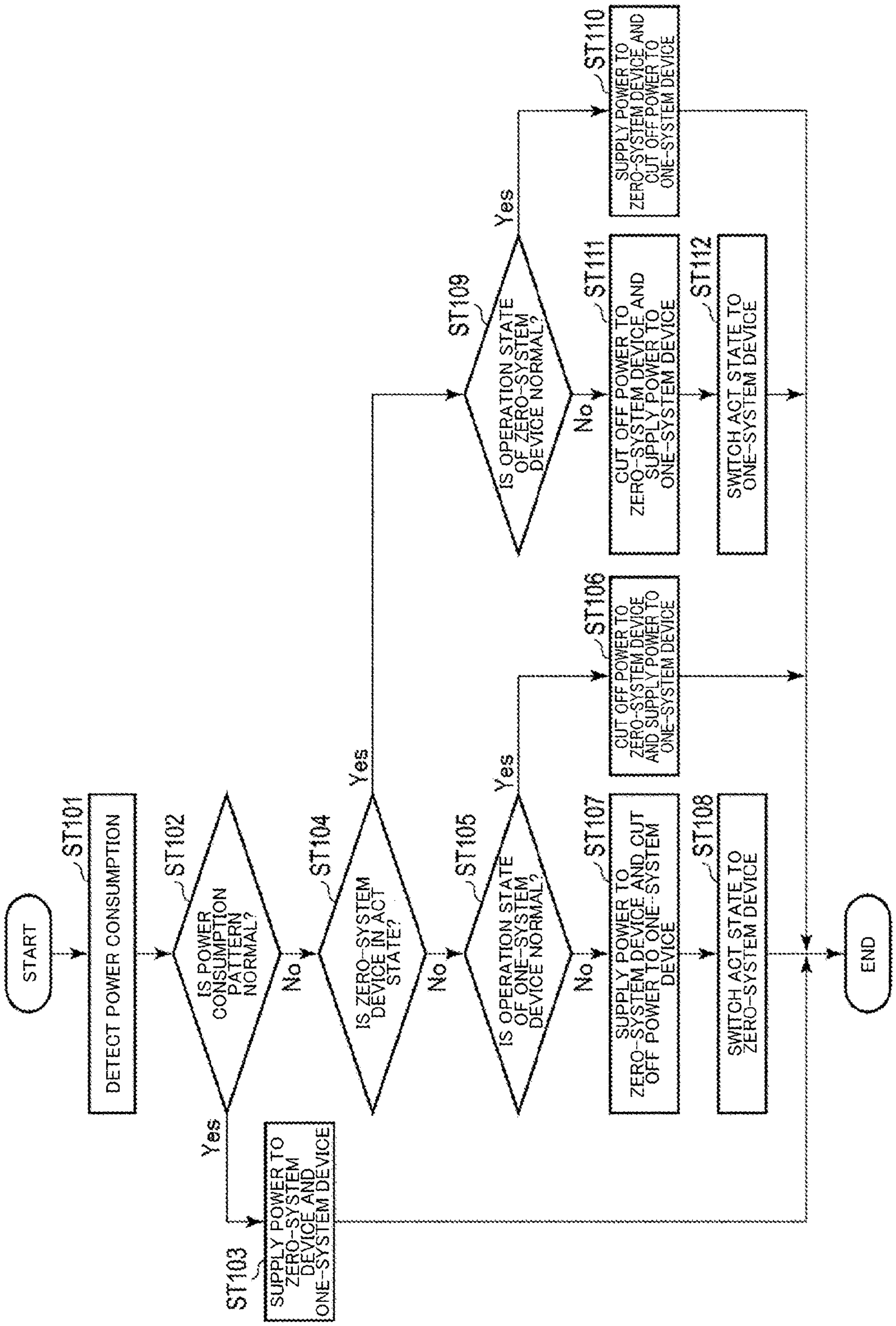
FIG. 4 is a flow chart showing an example of a power supply control operation of the power supply control device.

FIG. 4 is a flowchart showing an example of a power supply control operation of the power supply control device 20. The processor 1001 of each of the zero-system device 100 and the one-system device 101 reads and executes the programs stored in the program memory 1002, and the processor 2001 of the power supply control device 20 reads and executes the power supply control programs stored in the program memory 2002, thereby realizing the operation of the flowchart.

Here, the flowchart shows an operation repeated in a constant cycle when the zero-system device 100 and the one-system device 101 are operating.

Further, the zero-system device 100 may operate by supplying power from the zero-system power supply 200, or may operate by supplying power from both the zero-system power supply 200 and the one-system power supply 201. Likewise, the zero-system device 101 may operate by supplying power from the one-system power supply 201, or may operate by supplying power from both the zero-system power supply 200 and the one-system power supply 201.

The power supply monitoring unit 202 detects power consumption of the zero-system device 100 and the one-system device 101 (step ST101). The power supply monitoring unit 202 detects the amount of electric power supplied to the zero-system device 100 and the one-system device 101 by the zero-system power supply 200 and the one-system power supply 201, respectively. Then, the power supply monitoring unit 202 detects power consumption of the zero-system device 100 and the one-system device 101 from the detected amount of electric power. Here, the power supply monitoring unit 202 can individually detect the power consumption of the zero-system device 100 and the power consumption of the one-system device 101. For example, when the zero-system power supply 200 supplies power to the zero-system device and the one-system power supply 201 supplies power to the one-system device 101, the power supply monitoring unit 202 detects the power consumption of the zero-system device 100 based on the power supplied by the zero-system power supply 200, and detects the power consumption of the one-system device 101 based on the power supplied by the one-system power supply 201. In addition, when each of the zero-system power supply 200 and the one-system power supply 201 supplies power to both the zero-system device 100 and the one-system device 101, the power supply monitoring unit 202 detects the power consumption of the zero-system device 100 based on the sum of power supplied to the zero-system device 100 by the zero-system power supply 200 and the one-system power supply 201. Similarly, the power supply monitoring unit 202 detects the power consumption of the one-system device 101 based on the sum of the power supplied to the one-system device 101 by the zero-system power supply 200 and the one-system power supply 201. In addition, the power supply monitoring unit 202 transmits power consumption information including the detected power consumption to the power supply control unit 203.

The power supply control unit 203 determines whether the power consumption pattern of the power consumption generated by a mutual monitoring process is normal (step ST102). Specifically, for example, the power supply control unit 203 determines whether the mutual monitoring process in the redundant device system 10 is normal based on the power consumption of the power consumption information received from the power supply monitoring unit 202. In a normal mutual monitoring process, for example, information such as the operating state and various statuses of the transmission side device is encrypted and transmitted, and decrypted by the reception side device to detect the state of the transmission side device. Then, the mutual monitoring process is performed in synchronization with, for example, a heartbeat cycle. Thus, the loads on the processors 1001 of the transmission and reception side devices are periodically increased in accordance with the processing caused by the mutual monitoring process, and the power consumption is also changed in a constant cycle. However, with respect to power consumption in an abnormal mutual monitoring process, the power consumption do not have a constant cycle or does not change periodically. The power supply control unit 203 determines whether the power consumption pattern based on the power consumption included in the power consumption information is normal.

When it is determined that the power consumption pattern is normal, that is, when the mutual monitoring process is normal, the power supply control unit 203 performs control such that power is supplied to the zero-system device 100 and the one-system device 101 by using the zero-system power supply 200 and the one-system power supply 201 (step ST103). Specifically, for example, when it is determined that the power consumption changes in a constant cycle according to the mutual monitoring process, that is, the power consumption pattern is normal, the power supply control unit 203 controls the zero-system power supply 200 and the one-system power supply 201 such that power is supplied to both the zero-system device 100 and the one-system device 101. Thus, when the mutual monitoring process operates normally, power is supplied from the zero-system power supply 200 and the one-system power supply 201, and the zero-system device 100 and the one-system device 101 operate in the ACT state or the SBY state. For example, the zero-system device 100 operates in the ACT state, and the one-system device 101 operates in the SBY state. In addition, when an abnormal state of the zero-system device 100 operating in the ACT state is detected by the one-system device 101 in the SBY state in the mutual monitoring process, the one-system device 101 switches to the ACT state and can take over the operation performed by the zero-system device 100.

When it is determined that the power consumption does not change in a constant cycle or does not change periodically, that is, the power consumption pattern is abnormal, the power supply control unit 203 determines whether the zero-system is in the ACT state (step ST104). Specifically, for example, the power supply control unit 203 compares the power consumption of the zero-system device 100 with the power consumption of the one-system device 101 included in the power consumption information, and determines that the device with larger power consumption is in the ACT state. Since power consumption increases in the device in the ACT state, the power supply control unit 203 determines that the device with larger power consumption is in the ACT state.

When it is determined that the one-system device 101 is in the ACT state, the power supply control unit 203 determines whether the operation state of the one-system device 101 is normal (step ST105). If the one-system device 101 in the ACT state is operating normally, the power consumption of the one-system device 101 does not greatly change. Thus, the power consumption of the one-system device 101 per unit time falls within a predetermined range. On the other hand, some cases in which the power consumption is increased when, for example, an infinite loop processing in which the one-system device 101 enters an abnormal state is performed, or for example, power consumption is reduced since a certain processing operation is stopped may be conceivable. In those cases, since the power consumption of the one-system device 101 increases or decreases, the power consumption deviates from the predetermined range. Thus, when the power consumption of the one-system device 101 in the ACT state falls within the predetermined range, the power supply control unit 203 determines that the one-system device is operating normally. On the other hand, when the power consumption of the one-system device 101 is out of the predetermined range, the power supply control unit 203 determines that the one-system device 101 is in an abnormal state.

When the operation state of the one-system device 101 is normal, the power supply control unit 203 cuts off the power supply to the zero-system device 100 and supplies power only to the one-system device 101 (step ST106). Since the mutual monitoring process is abnormal, for example, even if abnormality occurs in the one-system device 101, the zero-system device 100 in the SBY state cannot switch to the ACT state through the mutual monitoring process. Thus, the power supply control unit 203 uses the zero-system power supply 200 and the one-system power supply 201 to stop power supply to the zero-system device 100 in the SBY state in order to reduce power consumption, and performs control such that only the one-system device 101 in the ACT state operates. Specifically, for example, when the zero-system device 100 is configured to receive supply of power from the zero-system power supply 200 and the one-system device 101 is configured to receive supply of power from the one-system power supply 201, the power supply control unit 203 cuts off the power supply from the zero-system power supply 200, that is, stops the zero-system power supply 200 and continues the power supply from the one-system power supply 201. In addition, for example, when the zero-system device 100 and the one-system device 101 receives supply of power from the zero-system power supply 200 and the one-system power supply 201, respectively, the power supply control unit 203 performs control such that power supply from the zero-system power supply 200 to the zero-system device 100 and the one-system device 101 is cut off and power supply from the one-system power supply 201 to the zero-system device 100 and the one-system device 101 is continued. In this case, the power supply control unit 203 further transmits a control signal including an instruction of shutdown to the zero-system device 100 as indicated by the broken-line arrows in FIG. 1. Furthermore, when the zero-system device 100 and the one-system device 101 are supplied with power from the zero-system power supply 200 and the one-system power supply 201, respectively, and have a configuration for cutting off power feeding in the middle of the power feeding path of each of the power devices, the power supply control unit 203 performs control such that the power supply from the zero-system power supply 200 and the one-system power supply 201 to the zero-system device 100 is cut off and the power supply from the zero-system power supply 200 and the one-system power supply 201 to the one-system device 101 is continued. Due to this cutoff of the power supply (and transmission of a control signal), the zero-system device 100 in the SBY state is shutdown.

When it is determined that the one-system device 101 is in an abnormal state in step ST105, the power supply control unit 203 supplies power only to the zero-system device 100 and cuts off power supply to the one-system device 101 (step ST107). Specifically, for example, when the zero-system device 100 is supplied with power from the zero-system power supply 200 and the one-system device 101 is supplied with power from the one-system power supply 201, the power supply control unit 203 starts power supply from the zero-system power supply 200 and cuts off power supply from the one-system power supply 201. In addition, for example, when the zero-system device 100 and the one-system device 101 are supplied with power from each of the zero-system power supply 200 and the one-system power supply 201, the power supply control unit 203 performs control such that power supply from the one-system power supply 201 to the zero-system device 100 and the one-system device 101 is started and power supply from the zero-system power supply 200 to the zero-system device 100 and the one-system device 101 is cut off. In this case, since the one-system device 101 is in an abnormal state, even if the power supply control unit 203 transmits a control signal including an instruction of shutdown to the one-system device 101, the one-system device 101 may not receive the control signal. Even in such a case, however, it is desirable to transmit a control signal including an instruction of shutdown to the one-system device 101. In addition, for example, when the zero-system device 100 and the one-system device 101 are supplied with power from each of the zero-system power supply 200 and the one-system power supply 201, and have a configuration for cutting off power supply in the middle of the power feeding path of each device, the power supply control unit 203 performs control such that power supply from the zero-system power supply 200 and the one-system power supply 201 to the one-system device 101 is cut off and power supply from the zero-system power supply 200 and the one-system power supply 201 to the zero-system device 100 is started. Due to the cutoff of power supply described above, the one-system device 101 in which abnormality such as a failure occurs is shutdown, and the zero-system device 100 in the shutdown state is activated in the SBY state. For example, the zero-system device 100, which is a server, is set to be activated when power is supplied from the shutdown state due to a setting of Basic Input/Output System (BIOS) or Unified Extensible Firmware Interface (UEFI).

The processor 1001 of the zero-system device 100 causes the zero-system device 100 to switch from the SBY state to the ACT state (step ST108). For example, the power supply control unit 203 transmits a control signal including an instruction of a shifting from the SBY state to the ACT state to the zero-system device 100 as indicated the broken-line arrow in FIG. 1. Then, the processor 1001 of the zero-system device 100 transitions from the SBY state to the ACT state based on the control signal. In addition, in the case that the zero-system device 100 and the one-system device 101 are configured to be supplied with power from the zero-system power supply 200 and the one-system power supply 201, respectively, when it is detected that the power supply from the one-system power supply 201 is cut off and only the power supply from the zero-system power supply 200 is received in the step ST107, the processor 1001 of the zero-system device 100 switches the zero-system device 100 from the SBY state to the ACT state. As described above, the processor 1001 of the zero-system device 100 can sense that the one-system device 101 is in an abnormal state without depending on the mutual monitoring process since the power supply from the one-system power supply 201 is stopped and the power supply only from the zero-system power supply 200 is received, and the zero-system device 100 switches from the SBY state to the ACT state based on the sensing.

As described above, the power supply control unit 203 is able to monitor the power consumption of the zero-system power supply 200 and/or the one-system power supply 201 supplying power to the one-system device 101, cut off the power supply to the one-system device 101 immediately after the one-system device 101 in the ACT state enters an abnormal state, start power feeding to the zero-system device 100 in the power supply cut-off state, and switch the zero-system device 100 to the ACT state.

When it is determined that the one-system device 100 is in the ACT state in step ST104, the power supply control unit 203 determines whether the operation state of the one-system device 100 is normal (step ST109). If the zero-system device 100 in the ACT state operates normally, the power consumption of the zero-system device 100 falls within a predetermined range. On the other hand, when the zero-system device 100 is in an abnormal state, the power consumption of the zero-system device 100 increases or decreases, and thus the power consumption deviates from the predetermined range. Thus, when the power consumption of the zero-system device 100 in the ACT state falls within the predetermined range, the power supply control unit 203 determines that the zero-system device 100 is operating normally. On the other hand, when the power consumption of the zero-system device 100 is out of the predetermined range, the power supply control unit 203 determines that the zero-system device 100 is in an abnormal state.

When the operation state of the zero-system device 100 is normal, the power supply control unit 203 cuts off power supply to the one-system device 101 and supplies power only to the zero-system device 100 (step ST110). Since the mutual monitoring process is abnormal, for example, even if abnormality occurs in the zero-system device 100, the one-system device 101 in the SBY state is not able to switch to the ACT state through the mutual monitoring process. Therefore, the power supply control unit 203 uses the zero-system power supply 200 and the one-system power supply 201 to stop power supply to the one-system device 101 in the SBY state in order to reduce power consumption, and performs control such that only the zero-system device 100 in the ACT state operates. Specifically, for example, when the zero-system device 100 is supplied with power from the zero-system power supply 200 and the one-system device 101 is supplied with power from the one-system power supply 201, the power supply control unit 203 cuts off the power supply from the one-system power supply 201 and continues the power supply from the zero-system power supply 200. For example, when the zero-system device 100 and the one-system device 101 are supplied with power from the zero-system power supply 200 and the one-system power supply 201, respectively, the power supply control unit 203 performs control such that power supply from the zero-system power supply 200 and the one-system power supply 201 to the one-system device 101 is cut off and power supply from the zero-system power supply 200 and the one-system power supply 201 to the zero-system device 100 is continued. In this case, the power supply control unit 203 further transmits a control signal including an instruction of shutdown to the one-system device 101 as indicated by the broken-line arrow in FIG. 1. For example, when the zero-system device 100 and the one-system device 101 are supplied with power from the zero-system power supply 200 and the one-system power supply 201, respectively, and have a configuration of cutting off power feeding in the middle of the power feeding path of each device, the power supply control unit 203 performs control such that power supply from the zero-system power supply 200 and the one-system power supply 201 to the one-system device 101 is cut off and power supply from the zero-system power supply 200 and the one-system power supply 201 to the zero-system device 100 is continued. The one-system device 101 in the SBY state is shut down as the power supply is cut off as described above.

When it is determined that the zero-system device 100 is in an abnormal state in step ST109, the power supply control unit 203 supplies power only to the one-system device 101 and cuts off power supply to the zero-system device 100 (step ST111). Specifically, for example, when the zero-system device 100 is supplied with power from the zero-system power supply 200 and the one-system device 101 is supplied with power from the one-system power supply 201, the power supply control unit 203 starts the power supply from the one-system power supply 201 and cuts off the power supply from the zero-system power supply 200. In addition, for example, when the zero-system device 100 and the one-system device 101 are supplied with power from the zero-system power supply 200 and the one-system power supply 201, respectively, the power supply control unit 203 performs control such that power supply from the zero-system power supply 200 to the zero-system device 100 and the one-system device 101 is started and power supply from the zero-system power supply 200 to the zero-system device 100 and the one-system device 101 is cut off. In this case, since the zero-system device 100 is in an abnormal state, the zero-system device 100 may not receive the control signal even if the power supply control unit 203 transmits the control signal including the instruction of shutdown to the zero-system device 100. Even in such a case, however, it is desirable to transmit a control signal including an instruction of shutdown to the zero-system device 100. In addition, for example, when the zero-system device 100 and the one-system device 101 are supplied with power from the zero-system power supply 200 and the one-system power supply 201, respectively, and have a configuration of cutting off power feeding in the middle of the power feeding path of each device, the power supply control unit 203 performs control such that power supply from the zero-system power supply 200 and the one-system power supply 201 to the zero-system device 100 is cut off and power supply from the zero-system power supply 200 and the one-system power supply 201 to the one-system device 101 is started. Since power supply is cut off as described above, the zero-system device 100 in which abnormality such as a failure occurs is shut down, and the one-system device 101 in the shutdown state is activated to be in the SBY state. For example, the one-system device 101 serving as a server is set to be activated when power is supplied in a shutdown state with the setting of BIOS or UEFI.

The processor 1001 of the one-system device 101 causes the one-system device 101 to switch from the SBY state to the ACT state (step ST112). For example, the power supply control unit 203 transmits a control signal including an instruction of a shift from the SBY state to the ACT state to the one-system device 101 as indicated the broken-line arrow in FIG. 1. Then, the processor 1001 of the one-system device 101 transitions from the SBY state to the act state based on the control signal. In addition, in the case that the zero-system device 100 and the one-system device 101 are supplied with power from the zero-system power supply 200 and the one-system power supply 201, respectively, when it is detected that the power supply from the one-system power supply 200 is cut off and only the power supply from the one-system power supply 201 is received in the step ST111, the processor 1001 of the one-system device switches the one-system device 101 from the SBY state to the ACT state. As described above, the processor 1001 of the first-system device 101 can sense that the zero-system device 100 is in an abnormal state without depending on the mutual monitoring process since the power supply from the zero-system power supply 200 is stopped and the power supply only from the one-system power supply 201 is received, and the one-system device 101 switches from the SBY state to the ACT state based on the sensing.

As described above, the power supply control unit 203 is able to monitor the power consumption of the zero-system power supply 200 and/or the one-system power supply 201 supplying power to the one-system device 100, cut off the power supply to the zero-system device 100 immediately after the zero-system device 100 in the ACT state enters an abnormal state, start power feeding to the one-system device 101 in the power supply cut-off state, and switch the one-system device 101 to the ACT state.

FIG. 5 is a table showing power supply states in each state of the zero-system device 100 and the one-system device 101. For example, FIG. 5 shows in what mode power is supplied depending on whether the operations of the zero-system device 100 and the one-system device 101 are in the ACT or SBY state, whether the mutual monitoring is normal or abnormal, or whether the operation state is normal or abnormal.

For example, when the operation of the zero-system device 100 is in the ACT state, the mutual monitoring process is normal, and the operation state is abnormal, and when the operation of the one-system device 101 is in the SBY state, the mutual monitoring process is normal, and the operation state is normal, it is indicated that both the zero-system device 100 and the one-system device 101 are supplied with power. This is because the mutual monitoring process is normal with reference to the flowchart of FIG. 4.

In addition, for example, when the operation of the zero-system device 100 is in the ACT state, the mutual monitoring process is abnormal, and the operation state is abnormal, and when the operation of the one-system device 101 is in the SBY state, the mutual monitoring process is abnormal, and the operation state is normal, it is indicated that power supply to the zero-system device 100 is cut off and power is supplied only to the one-system device 101. This indicates that, referring to the flowchart of FIG. 4, the operation of the one-system device switches from the SBY state to the ACT state because the zero-system device 100 in the ACT state fails.

Further, there is no case that both the zero-system device 100 and the one-system device 101 are in the ACT state or the SBY state based on FIG. 5. Furthermore, there is no case that the mutual monitoring process is performed in different states in the zero-system device 100 and the one-system device 101.

Operational Effects

Even if the mutual monitoring process is not operated due to a failure and the device in the ACT state enters an abnormal state, the redundant system can continue the operation by switching the device in the SBY state to be in the ACT state.

Furthermore, when the mutual monitoring process is not operated due to a failure and the device in the ACT state is normal, power supply to the zero-system device 100 or the one-system device 101 in the SBY state is cut off, thereby reducing power consumption. Then, immediately after the device in the ACT state enters an abnormal state, power feeding to the device in the power supply cut off state is started, and the device can switch to the ACT state.

Other Embodiments

Further, the present invention is not limited to the embodiment described above. For example, although an example of the redundant device system 10 having two devices is shown, the present invention can be applied to a redundant device system 10 having three or more devices.

In addition, the power supply monitoring unit 202 may detect power consumption of the zero-system device 100 and the one-system device 101 based on the power supplied by the zero-system power supply 200 and the one-system power supply 201 to the zero-system device 100 and the one-system device 101. When the zero-system device 100 and the one-system device 101 have a means for measuring their own power consumption, the power supply monitoring unit 202 may be omitted by inputting the measurement result to the power supply control unit 203.

Furthermore, detection of abnormality of the mutual monitoring process in the redundant device system 10 and detection of abnormality of the zero-system device 100 and the one-system device 101 may be performed using another method that is not based on the power consumption of the zero-system device 100 and the one-system device 101.

In addition, in step ST106 or step ST110, in addition to the control over the zero-system power supply 200 and the one-system power supply 201, the warning about occurrence of abnormality in the mutual monitoring process may be issued. Similarly, in step ST107 or step ST111, in addition to the control over the zero-system power supply 200 and the one-system power supply 201, warning about occurrence of an abnormal operation of the zero-system device 100 or the one-system device 101 may be issued. Thus, it is possible to reduce a possibility of the system stopping due to simultaneous occurrence of abnormality in the zero-system device 100 and the one-system device 101.

Furthermore, when the zero-system device 100 and the one-system device 101 of the redundant device system 10 are activated from a shutdown state, the operations of step ST108 and step ST112 may be omitted by configuring that the devices are activated to be in the ACT state, instead of the SBY state.

In addition, the methods described in the embodiment presented above can be stored as a program (software means) that can be executed by a computer in a storage medium, for example, a magnetic disk (a floppy (registered trademark) disk, a hard disk, or the like), an optical disc (a CD-ROM, a DVD, a MO, or the like), a semiconductor memory (a ROM, a RAM, a flash memory, or the like) or transmitted and distributed using a communication medium. Further, the program stored on the medium side includes a configuration program for configuring, in the computer, software means (including not only an execution program but also table and data structures) to be executed by the computer. The computer that realizes the present devices reads the program stored in the storage medium and, in some cases, constructs a software means by the configuration program, and executes the processing described above by having operations being controlled by the software means. Further, the storage media as referred to in the present specification are not limited to storage media for distribution, and include storage media such as a magnetic disk or a semiconductor memory provided in a computer or in a device connected via a network.

In short, the present invention is not limited to the embodiment described above and can be variously modified in an implementation stage without departing from the spirit and scope of the invention. In addition, each embodiment may be appropriately combined to the greatest extent feasible and, in such a case, combined effects are produced. Furthermore, the embodiment described above includes inventions in various stages, and various inventions may be extracted through appropriate combinations of the plurality of disclosed constituent elements.

REFERENCE SIGNS LIST

10 Redundant device system
100 Zero-system device
101 One-system device
1001 Processor
1002 Program memory
1003 Data memory
1004 Communication interface
1005 Input/output interface
1006 Bus
1007 Input unit
1008 Display unit
20 Power supply control device
200 Zero-system power supply
201 One-system power supply
202 Power supply monitoring unit
203 Power supply control unit
2001 Processor
2002 Program memory
2003 Data memory
2004 Communication interface
2005 Input/output interface
2006 Bus
2007 Input unit
2003 Display unit

The invention claimed is:

1. A power supply control device comprising:

a first power supply and a second power supply configured to supply power to a first device and a second device that are mutually monitored in a mutual monitoring process in a redundant device system; and a power supply control unit, comprising one or more processors, configured to switch an operation state of the first device and the second device based on whether a power consumption pattern of first power consumption of the first device and second power consumption of the second device is normal, wherein the first power consumption and the second power consumption periodically change in accordance with the mutual monitoring process, and when the first power consumption and the second power consumption change in a constant cycle, the power supply control unit is configured to determine that the power consumption pattern is normal, and control the first power supply and the second power supply such that power is supplied to the first device and the second device, wherein when one of the first device and the second device is in an active state and the other one of the first device and the second device is in a standby state, and the first power consumption and the second power consumption do not change in the constant cycle or do not change periodically, the power supply control unit is configured to determine that the power consumption pattern is abnormal, and when the power consumption pattern is abnormal, the power supply control unit is configured to compare the first power consumption with the second power consumption to determine which of the first device and the second device is in the active state, and when the first device is in the active state, the power supply control unit is configured to determine whether the first device is in a normal state based on the first power consumption, and switch the operation state of the first device and the second device based on a result of the determination.

2. The power supply control device according to claim 1, wherein the power supply control unit is configured to determine that the first device is in the normal state and cut off power supply to the second device when the first power consumption is within a predetermined range.

3. The power supply control device according to claim 1, wherein when it is determined that the first device is in an abnormal state, the power supply control unit is configured to cut off power supply to the first device, and supply power only to the second device using the first power supply and the second power supply.

4. The power supply control device according to claim 3, wherein the power supply control unit is configured to perform control such that the power is supplied to the second device only from the second power supply.

5. A power supply control method executed by a device, the power supply control method comprising:

using a first power supply and a second power supply to supply power to a first device and a second device that are mutually monitored in a mutual monitoring process in a redundant device system; and switching an operation state of the first device and the second device based on whether a power consumption pattern of first power consumption of the first device and second power consumption of the second device is normal, wherein the first power consumption and the second power consumption periodically change in accordance with the mutual monitoring process, and when the first power consumption and the second power consumption change in a constant cycle, determining that the power consumption pattern is normal and controlling the first power supply and the second power supply such that power is supplied to the first device and the second device, wherein when one of the first device and the second device is in an active state and the other one of the first device and the second device is in a standby state and the first power consumption and the second power consumption do not change in the constant cycle or do not change periodically, determining that the power consumption pattern is abnormal, and when the power consumption pattern is abnormal, comparing the first power consumption with the second power consumption to determine which of the first device and the second device is in the active state, and when the first device is in the active state, determining whether the first device is in a normal state based on the first power consumption and switching the operation state of the first device and the second device based on a result of the determination.

6. A non-transitory computer readable medium storing a program, wherein execution of the program causes a processor to function as the power supply control device according to claim 1.

* * * * *